United States Patent [19]
Murkett et al.

[11] Patent Number: 5,544,934
[45] Date of Patent: Aug. 13, 1996

[54] PASSENGER CAR WITH A REMOVABLE TOP ASSEMBLY

[75] Inventors: Stephen Murkett, Gerlingen; Jürgen Bayer, Weissach, both of Germany

[73] Assignee: Dr. Ing. h.c.F. Porsche AG, Weissach, Germany

[21] Appl. No.: 324,395

[22] Filed: Oct. 17, 1994

[30] Foreign Application Priority Data

Oct. 15, 1993 [DE] Germany .......................... 43 35 653.2

[51] Int. Cl.$^6$ ...................................................... B60J 7/047
[52] U.S. Cl. ............................ 296/215; 296/102; 296/217
[58] Field of Search ................................... 296/215, 216, 296/217, 218, 220, 222, 102

[56] References Cited

U.S. PATENT DOCUMENTS

| | | | |
|---|---|---|---|
| 4,113,303 | 9/1978 | Yench | 296/218 X |
| 4,659,140 | 4/1987 | Fuerst et al. | 296/217 X |
| 4,684,168 | 8/1987 | Lupo | 296/217 |
| 4,708,389 | 11/1987 | Maebayashi et al. | 296/218 X |
| 4,801,174 | 1/1989 | Hirshberg et al. | 296/216 |
| 4,852,938 | 8/1989 | Hirshberg et al. | 296/220 X |
| 4,978,161 | 12/1990 | Schulze | 296/102 X |
| 5,112,100 | 5/1992 | Murkett et al. | 296/218 X |

FOREIGN PATENT DOCUMENTS

| | | | |
|---|---|---|---|
| 958347 | 3/1950 | France . | |
| 822658 | 7/1949 | Germany . | |
| 1131528 | 6/1962 | Germany . | |
| 3024-619 | 1/1982 | Germany | 296/218 |
| 3429880C2 | 2/1986 | Germany . | |
| 62-155125 | 7/1987 | Japan | 296/220 |
| 2184404 | 6/1987 | United Kingdom . | |
| 2251223 | 7/1992 | United Kingdom . | |

OTHER PUBLICATIONS

Erpn. Srch. Rpt. Feb. 2, 1995 Europe.

Primary Examiner—David M. Mitchell
Assistant Examiner—Kia M. Robinson
Attorney, Agent, or Firm—Evenson McKeown Edwards & Lenahan

[57] ABSTRACT

A passenger car body includes a removable top constructed as a roof which covers a passenger compartment above a belt line of the body. So that the occupants have particularly good viewing conditions while the venting of the passenger compartment is good, the removable top has roof frames which bound the side windows and between which—viewed in the longitudinal direction of the vehicle—there extend several transparent roof sections.

38 Claims, 6 Drawing Sheets

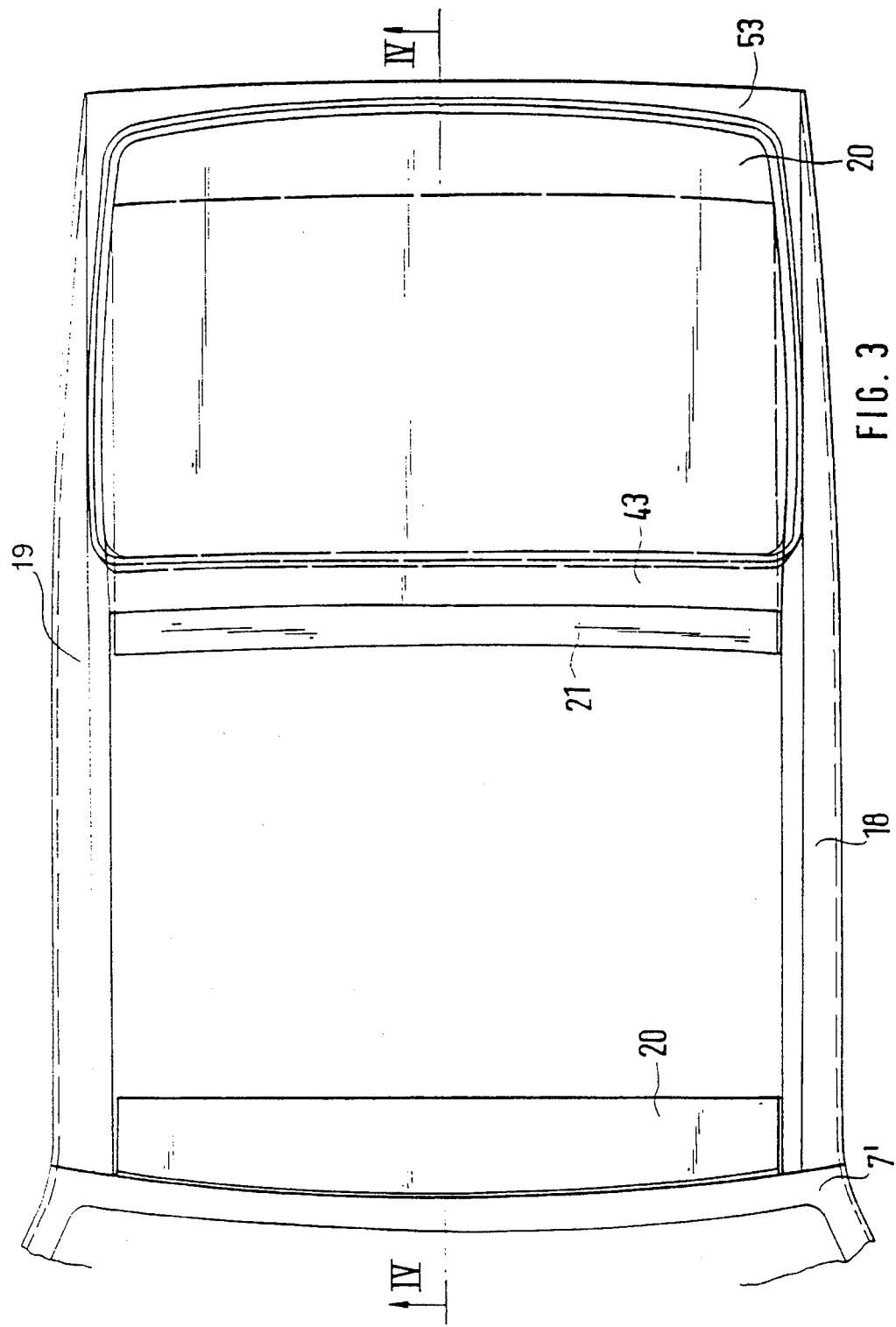

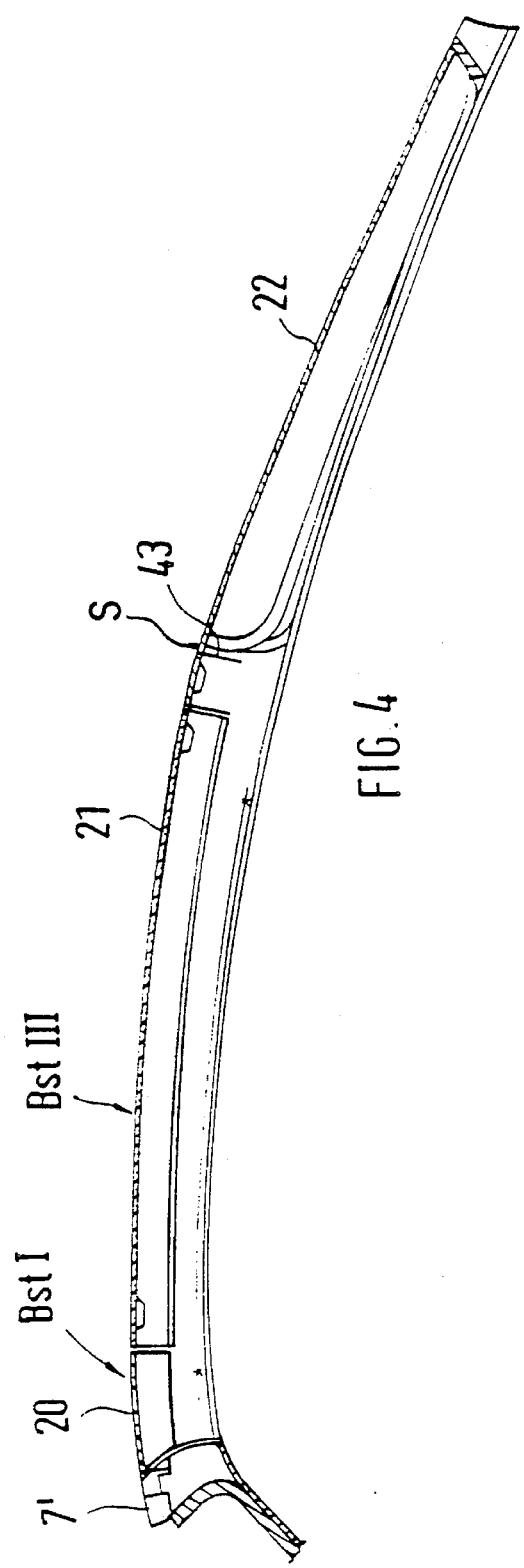
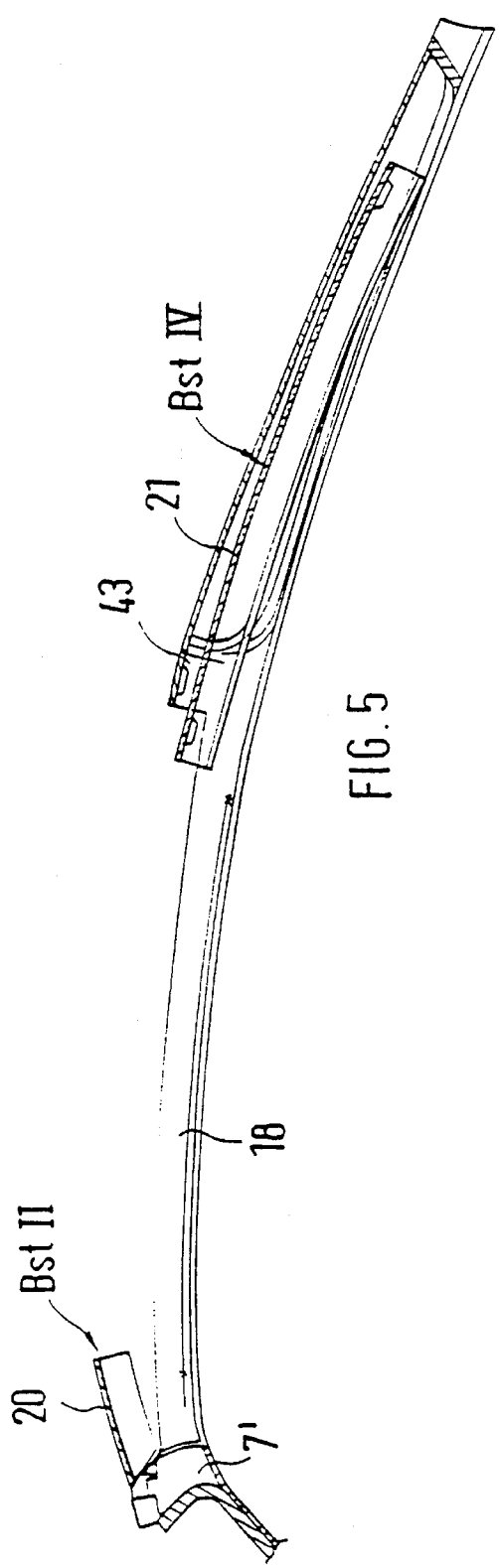

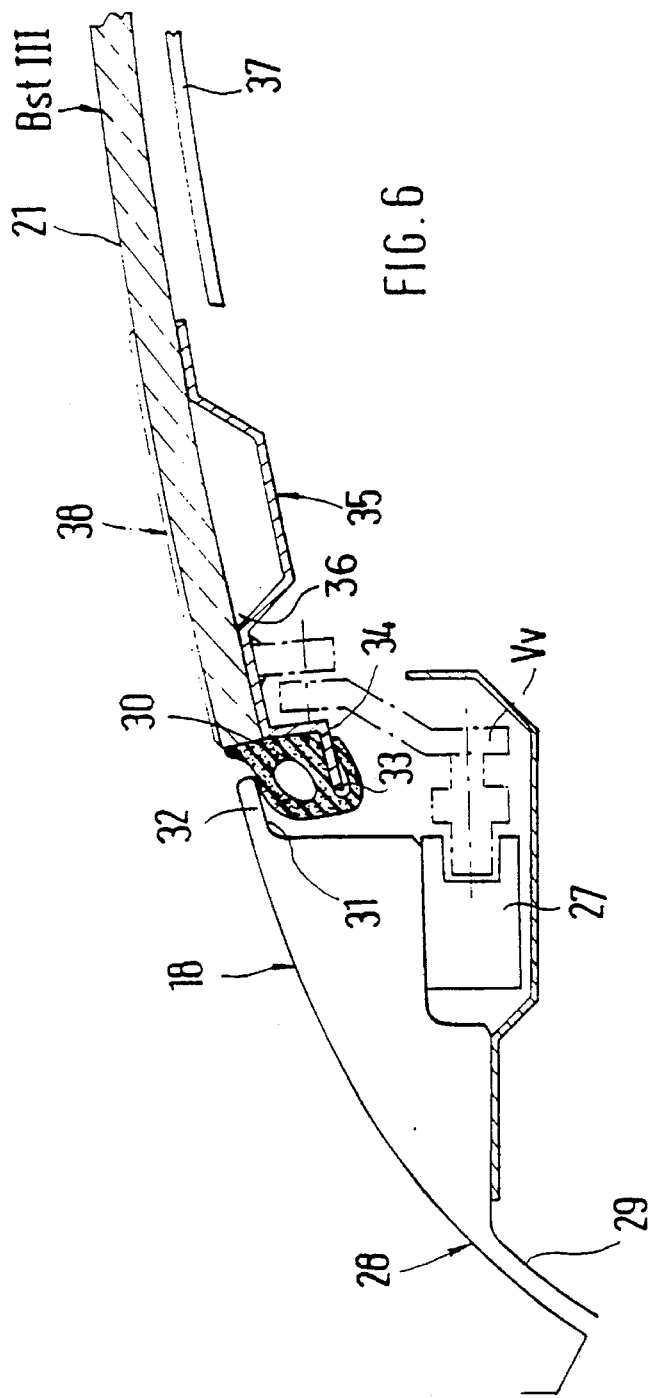
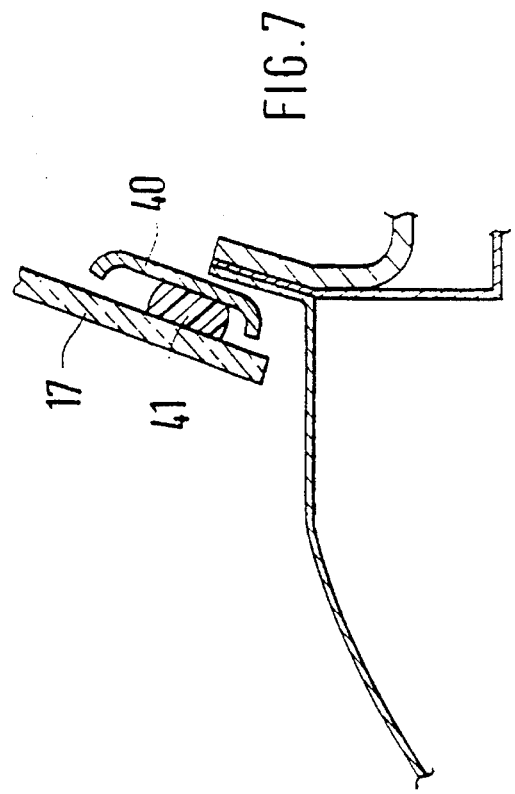

5,544,934

PASSENGER CAR WITH A REMOVABLE TOP ASSEMBLY

BACKGROUND AND SUMMARY OF THE INVENTION

This invention relates to a body for a passenger car of the type having a top constructed as a roof covering a passenger compartment above the vehicle body belt line.

From German Patent Document DE 822 658, a passenger car is known which has a top which comprises a closed roof which impairs the view of the occupants to the outside. Analogously, this applies to the coupe top according to German Patent Document DE 11 31 528.

In addition, a motor vehicle roof construction is known according to German Patent Document DE 34 39 880 in which a movable roof section is inserted into an opening of the body.

It is an object of the invention to design a top of the body of a passenger car in such a manner that the occupants' view to the outside is improved and a relatively large roof area can be opened.

According to the invention, this object is achieved by providing an arrangement wherein the top has laterally spaced lateral roof frames, bounding respective side windows, a first angularly movable roof section mounted adjacent to a vehicle windshield frame, an adjoining second longitudinally movable roof section, and a third fixed roof section which forms an extension of the second roof section, said roof sections extending laterally between the lateral roof frames.

The principal advantages achieved by means of the invention are that the top with its roof sections, which may consist of glass and may partially be openable, forms a purpose-oriented combination of a closed and an open body. In this case, it is not only the occupants' upward view which is excellent, for example, for viewing occurrences and landscapes above the roof, but, as a result of the movable roof sections, a good ventilation of the passenger compartment is also achieved, or similar to the situation in an open vehicle, the occupants can see the environment which is presented to them.

The movable roof sections are constructed in the manner of a sliding roof, in which case the first roof section is a wind deflector and the second roof section forms the actual sliding roof. The latter roof section is constructed to be adjustable under the third roof section by means of appropriate kinematics and guides.

The top comprises easily producible frames and supports which may be made of steel, plastic or light metal. The third roof section which, like the other roof sections, is a piece of glass, and the rear side windows are inserted into openings of the top and are fastened by means of gluing. As a result of this construction, the top has sufficient stiffness while its weight is acceptable.

Finally, the top, including its essential parts, may be a prefabricated module which is held by means of screwed connections at the vehicle body which may have the frame structure of a convertible. As a result, the top can be fastened to a convertible body without any significant changes so that another variant of the model can be provided by means of relatively low expenditures.

Other objects, advantages and novel features of the present invention will become apparent from the following detailed description of the invention when considered in conjunction with the accompanying drawings.

BRIEF DESCRIPTION OF THE DRAWINGS

FIG. 3 is a top view in the direction of the arrow A of FIG. 1;

FIG. 4 is a sectional view taken along Line IV—IV of FIG. 3;

FIG. 5 is a view corresponding to FIG. 4 showing the sliding roof section in an open position;

FIG. 6 is an enlarged sectional view taken along Line VI—VI of FIG. 1;

FIG. 7 is an enlarged sectional view taken along Line VII—VII of FIG. 1;

DETAILED DESCRIPTION OF THE PREFERRED EMBODIMENTS

Figure 1:
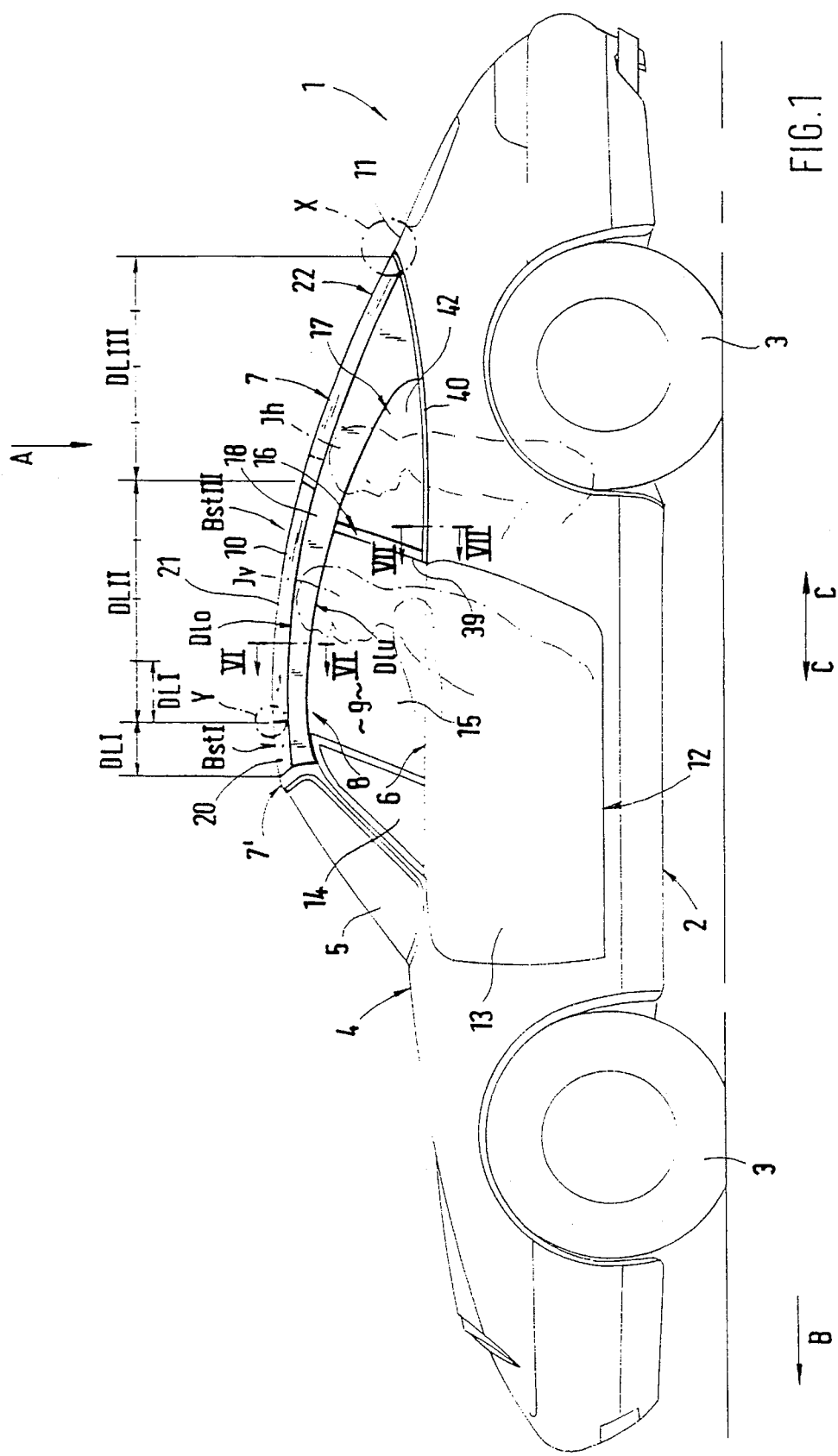
FIG. 1 is a lateral view of a passenger car with the vehicle body according to the invention.

The passenger car 1 comprises a vehicle body 2 which is carried by wheels 3. The body 2 is formed by a basic body 4 comprising a windshield 5 and a belt line 6. The basic body 4 is provided with a top 7 which is connected to an upper windshield frame 7' and the belt line 6 and which covers a passenger compartment 9 by means of a roof 8. A roof line 10, which extends approximately along the longitudinal center plane of the passenger car, extends between the windshield frame 7' and a rear opening 11 in a curve which slopes downward against the driving direction B but is continuous so that the vehicle body 2 has the shape of a coupe with a fast back.

On the longitudinal side of the vehicle, the basic body 4 is in each case provided with a door 12 which comprises a door body 13, a triangular window 14 and a slidable side window 15 whose rear door pane boundary 16 is relatively upright but is slightly sloped against the driving direction B. Another side window 17 is arranged behind the door-side side window 15 on the top 7. The side window 17 has a basic triangular shape and tapers against the driving direction B.

The top 7 has lateral roof frames 18 which bound the side windows 15, 17 and between which a first roof section 20, a second roof section 21 and a third roof section 22 are provided which are situated behind one another viewed in the longitudinal direction C—C of the vehicle. The first roof section 20 is constructed to be angularly movable between the operating positions Bst I and BstII—FIGS. 1 and 2—and, in its upright operating position Bst II, is used as a wind deflector which may be hinged to the roof frame 18 or to the windshield frame 7'. The second roof section 21 is constructed to be longitudinally movable—operating positions Bst III and Bst IV—in the manner of a sliding roof in such a fashion that it can be slid under the third roof section 22, specifically in the operating position Bst IV, the third roof section 22 being fixedly inserted into the top 7.

Figure 9:
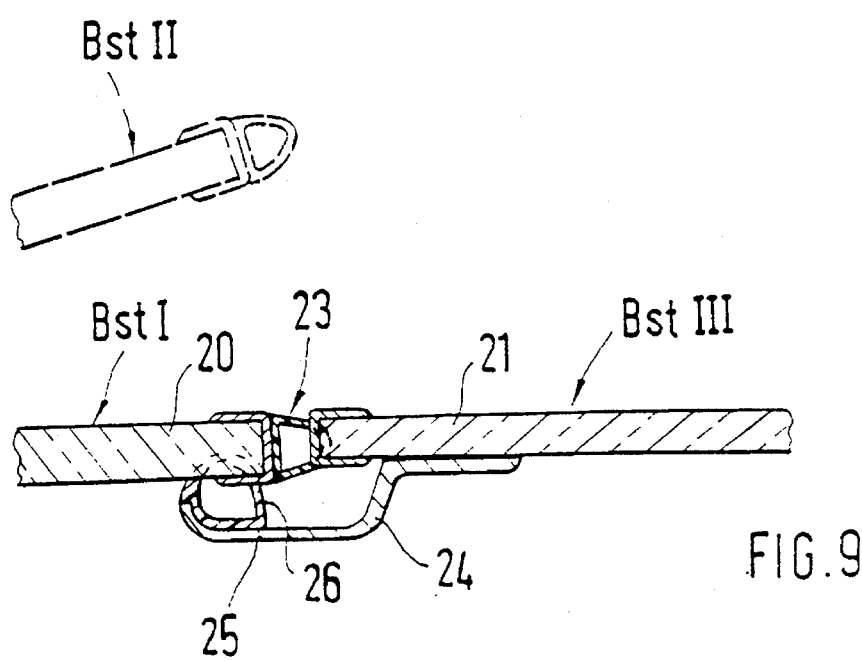
FIG. 9 is an enlarged detail Y of FIG. 1.

In the construction position or basic position, the roof sections 20, 21, and 22 are arranged with respect to one another so that their surfaces are flush, a sealing body 23 being provided between the roof sections 20 and 21 (FIG. 9). In this area, a rail 24 is provided at the bottom side of roof section 21 and reaches under the first roof section 20 by means of a web 25, in which case a seal 26 becomes operative between the web 25 and the first roof section 20. A seal S (schematically depicted in FIG. 4) can also be provided between the second roof section 21 and the third roof section 22.

In order to move the second roof section 21 from operating position Bst III into operating position Bst IV, a guide rail 27 (FIG. 6) is used which is mounted on the roof frame 18. Between the guide rail 27 and the second roof section 21, one or several connecting devices Vv are provided. In FIG. 6, it is shown that the roof frame 18 comprises an outer shell 28 and an inner shell 29, the guide rail 27 being held on the inner shell 29. By means of a sealing body 30, the second roof section 21 interacts with the inner side 31 of a flange 32 which is formed by the outer shell 28 and the inner shell 29. By means of a receiving device 33, the sealing body 30 reaches around a flange 34 of a profiled carrier 35 which is fastened to the bottom side 36 of the second roof section 21 by means of suitable methods and is mounted to be rotating and is used for reinforcing the relatively large-surface roof section 21. The connecting device Vv comprises a lever apparatus which is used for moving the roof section 21, on the one hand, in the longitudinal vehicle direction C—C and, on the other hand, into the operating position Bst IV.

For ensuring a good view for all occupants of the passenger car 1, all roof sections 20, 21 and 22 are made of viewing glass. This may be a multilayered sunshade glass. In addition, photochromic glass is conceivable. Furthermore, a blind 37 (FIG. 6) may be provided on the interior side of the roof sections 20, 21 which, for example, when the vehicle is stopped, can be brought into a closed or covering position. There is also the possibility of tinting the glass, for example, black, on the exterior side of roof section 21 in the area of the support 35 at reference number 38, whereby, on the one hand, the support 35 is covered and, on the other hand, peculiar aesthetic effects can be achieved. The tinting may be provided on all roof sections in a surrounding fashion as an edge.

Figure 2:
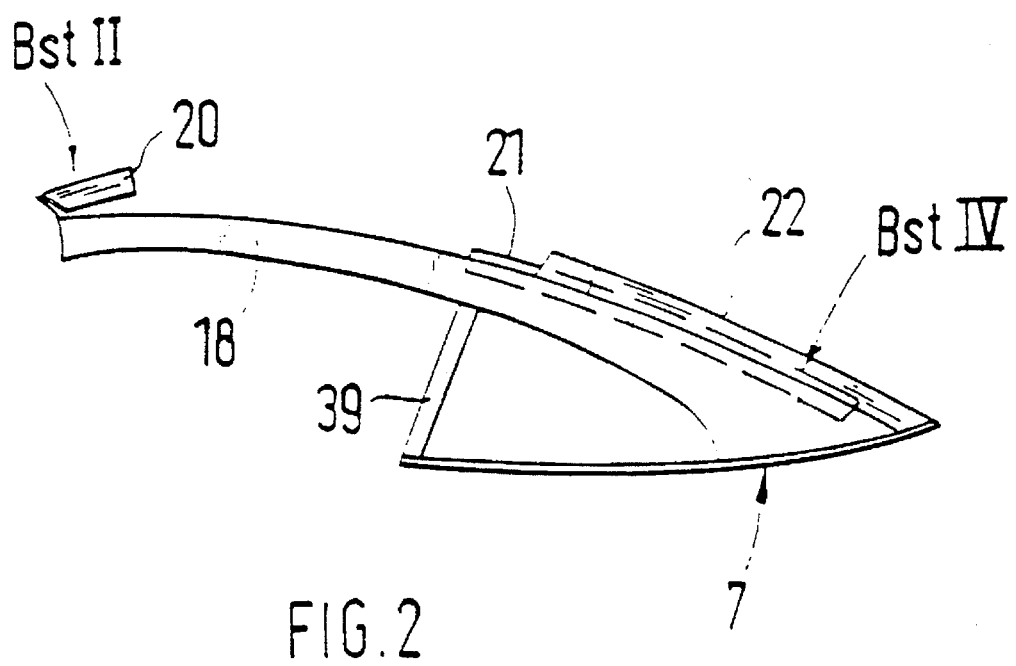
FIG. 2 is a partial view of FIG. 1.

Favorable conditions for the length of the roof sections 20, 21, 22—viewed in the longitudinal direction C—C of the vehicle—are obtained in the case of the passenger car of the present embodiment if the second roof section 21 extends to behind the door window boundary 16 or an area above an occupant of the rear compartment Ih who sits behind an occupant of the front compartment Iv. In this case, the length DL II and DL III of the second roof section 21 and of the third roof section 22 is approximately four times larger than the length DL I of the first roof section 20 (FIG. 1). In addition, roof sections 20 and 21 may be designed to be as wide as possible which results in a relatively narrow and light configuration of the roof frames.

A pillar 39 leads away from the roof frame 18 bounding the roof sections 20, 21, 22 and extends specifically in the area of the rear door pane boundary 16. This pillar 39 leads into a supporting carrier 40, which extends above the belt line 6, of the top 7 (FIG. 7) which extends along the belt line 6 between the opposing pillars 39. The supporting carrier 40 has a U-shaped cross-section and holds the side window 17 (FIG. 7) in position by means of an adhesive body 41. The side window 17 is therefore inserted into an opening 42 which is bounded by the lateral roof frame 18 of the pillar 39 and the supporting carrier 40.

The opposing roof frames 18, which according to FIG. 1 expand in their cross-section against the driving direction B, which is indicated by Lines DLo and DLu, in the area of the third roof section 22, specifically adjacent to the second roof section 21, are connected with a cross piece 43 on which the third roof section 22 rests. It is held in position on the top 7 by means of gluing. The roof line 10 and the Line DLo extend approximately at the same distance from one another.

Together with the roof sections 20, 21, 22, the lateral supports 18, 19, the pillars 39, the cross piece 43, the supporting carrier 40 and the rear side windows 17, the top 7 forms a prefabricated module which is connected with the vehicle body 2 or basic body 4 by means of one or several screwed connections 44.

Figure 8:
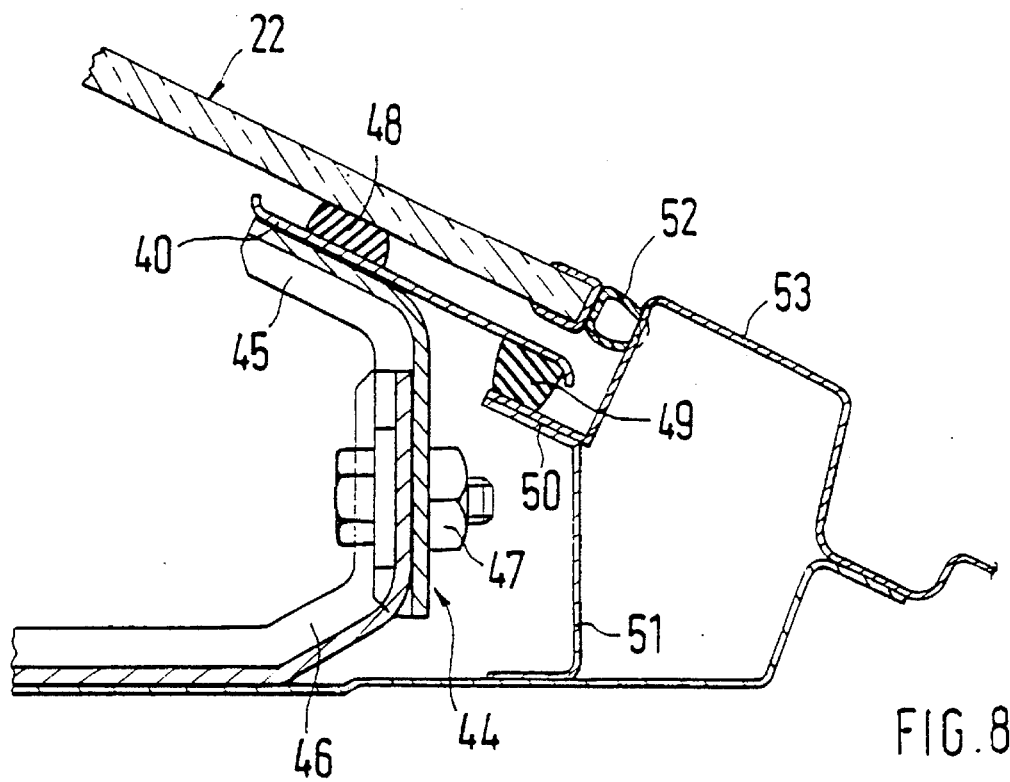
FIG. 8 is an enlarged detail X of FIG. 1.

An embodiment of a screwed connection is illustrated in FIG. 8. Accordingly, the supporting carrier 40 is provided with an angle 45 which extends to another angle 46 of the vehicle body 2. A screw 47 is provided between the two angles 45, 46. Furthermore, on the one hand, the supporting carrier 40 is connected via an adhesive body 48 with the third roof section 22 and, on the other hand, extends by means of a sealing device 49 to a flange 50 of an interior cross piece 51 of the vehicle body 2. Finally, the third roof section 22 adjoins an outer cross piece 53 by means of a sealing body 52.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A passenger car of the type having a windshield frame, a belt line extending rearwardly of the windshield frame, side windows extending above the belt line, and a top, said top comprising:

a pair of laterally spaced lateral roof frames attachable to the windshield frame so as to extend rearwardly over said side windows in a downwardly sloping curve toward the belt line, a first angularly movable wind deflector roof section extending laterally between and supported at a forward section of the lateral roof frames, a second movable roof section disposed rearwardly of the first roof section, a third roof section disposed rearwardly of the second roof section, said third roof section extending between and fixedly supported by respective rearward sections of the lateral roof frames, and lateral guide rails disposed directly on the lateral roof frames which supportably guide movement of the second roof section between a closed top position in front of the third roof section and an open top position disposed at least partially under the third roof section, wherein said first, second and third roof sections are all constructed of transparent material for ensuring a good view for all occupants of the passenger car.

2. A passenger car according to claim 1, wherein each lateral roof frame comprises an outer shell and an inner shell, and wherein the lateral guide rails are held on the respective inner shells of the respective lateral roof frames.

3. A passenger car according to claim 1, wherein said second and third roof sections are approximately four times as long as said first roof section.

4. A passenger car according to claim 1, wherein each side of said top includes:

a vehicle rear side window, a pillar connected at its top to one of said lateral frames and at its bottom to a rearwardly extending supporting carrier, adapted to extend along the belt line, said pillar and supporting carrier bounding and supporting respective front and bottom sides of the vehicle rear side window.

5. A passenger car according to claim 1, wherein said lateral roof frames extend between the top of the passenger car windshield frame and a rear side of a most rearward side window of the passenger car in a curve which slopes continuously downward to the belt line to form a fast back coupe passenger car shape.

6. A passenger car according to claim 1, wherein the three roof sections are aligned in a surface-flush manner with respect to one another when said second roof section is in the closed top position.

7. A passenger car according to claim 1, wherein sealing bodies are provided for sealing the space between the first roof section and the second roof section as well as between the second roof section and the third roof section when the second roof section is in the closed position.

8. A passenger car according to claim 1, wherein each of the roof sections consists of transparent glass having characteristics which protect against the sun.

9. A passenger car according to claim 1, wherein the top includes respective pillars leading away from the lateral frames in an area of respective rear door pane boundaries, which pillars lead into a supporting carrier of the top extending above the belt line.

10. A passenger car according to claim 1, wherein the third roof section adjacent to the second roof section rests on a cross piece extending between the lateral roof frames for supporting a front of the third roof section.

11. A passenger car according to claim 1, wherein the third roof section and rear side windows are connected with the top by means of gluing.

12. A passenger car according to claim 1, wherein the top with the three roof sections, the lateral guide rails and roof frames, the pillars, the cross piece, the supporting carrier and vehicle rear side windows together form a prefabricated module.

13. A passenger car according to claim 12, wherein the top is held on the vehicle body by means of one or several screwed connections.

14. A passenger car according to claim 2, wherein said second and third roof sections are approximately four times as long as said first roof section.

15. A passenger car according to claim 14, wherein each side of said top includes:

a vehicle rear side window, a pillar connected at its top to one of said lateral frames and at its bottom to a rearwardly extending supporting carrier, adapted to extend along the belt line, said pillar and supporting carrier bounding and supporting respective front and bottom sides of the vehicle rear side window.

16. A passenger car according to claim 15, wherein said lateral roof frames extend between the top of the passenger car windshield frame and a rear side of a most rearward side window of the passenger car in a curve which slopes continuously downward to the belt line to form a fast back coupe passenger car shape.

17. A passenger car according to claim 16, wherein the three roof sections are aligned in a surface-flush manner with respect to one another when said second roof section is in the closed top position.

18. A passenger car according to claim 17, wherein the third roof section adjacent to the second roof section rests on a cross piece extending between the lateral roof frames for supporting a front of the third roof section.

19. A passenger car according to claim 18, wherein the top with the three roof sections, the lateral guide rails and roof frames, the pillars, the cross piece, the supporting carrier and vehicle rear side windows together form a prefabricated module.

20. A top for a passenger car of the type having a windshield frame, a belt line extending rearwardly of the windshield frame, side windows extending above the belt line, and said top, said top comprising:

a pair of laterally spaced lateral roof frames attachable to the windshield frame so as to extend rearwardly over said side windows in a downwardly sloping curve toward the belt line, a first angularly movable wind deflector roof section extending laterally between and supported at a forward section of the lateral roof frames, a second movable roof section disposed rearwardly of the first roof section, a third roof section disposed rearwardly of the second roof section, said third roof section extending between and fixedly supported by respective rearward sections of the lateral roof frames, and lateral guide rails disposed directly on the lateral roof frames which supportably guide movement of the second roof section between a closed top position in front of the third roof section and an open top position disposed at least partially under the third roof section, wherein said first, second and third roof sections are all constructed of transparent material for ensuring a good view for all occupants of the passenger car.

21. A top according to claim 20, wherein each lateral roof frame comprises an outer shell and an inner shell, and wherein the lateral guide rails are held on the respective inner shells of the respective lateral roof frames.

22. A top according to claim 20, wherein said second and third roof sections are approximately four times as long as said first roof section.

23. A top according to claim 20, wherein each side of said top includes:

a vehicle rear side window, a pillar connected at its top to one of said lateral frames and at its bottom to a rearwardly extending supporting carrier, adapted to extend along the belt line, said pillar and supporting carrier bounding and supporting respective front and bottom sides of the vehicle rear side window.

24. A top according to claim 20, wherein said lateral roof frames extend between the top of the passenger car windshield frame and a rear side of a most rearward side window of the passenger car in a curve which slopes continuously downward to the belt line to form a fast back coupe passenger car shape.

25. A top according to claim 20, wherein the three roof sections are aligned in a surface-flush manner with respect to one another when said second roof section is in the closed top position.

26. A top according to claim 20, wherein sealing bodies are provided for sealing the space between the first roof section and the second roof section as well as between the second roof section and the third roof section when the second roof section is in the closed position.

27. A top according to claim 20, wherein each of the roof sections consists of transparent glass having characteristics which protect against the sun.

28. A top according to claim 20, wherein the top includes respective pillars leading away from the lateral frames in an area of respective rear door pane boundaries, which pillars lead into a supporting carrier of the top extending above the belt line.

29. A top according to claim 20, wherein the third roof section adjacent to the second roof section rests on a cross piece extending between the lateral roof frames for supporting a front of the third roof section.

30. A top according to claim 20, wherein the third roof section and rear side windows are connected with the top by means of gluing.

31. A top according to claim 20, wherein the top with the three roof sections, the lateral guide rails and roof frames, the pillars, the cross piece, the supporting carrier and vehicle rear side windows together form a prefabricated module.

32. A top according to claim 31, wherein the top is held on the vehicle body by means of one or several screwed connections.

33. A top according to claim 21, wherein said second and third roof sections are approximately four times as long as said first roof section.

34. A top according to claim 33, wherein each side of said top includes:
- a vehicle rear side window,
- a pillar connected at its top to one of said lateral frames and at its bottom to a rearwardly extending supporting carrier, adapted to extend along the belt line, said pillar and supporting carrier bounding and supporting respective front and bottom sides of the vehicle rear side window.

35. A top according to claim 34, wherein said lateral roof frames extend between the top of the passenger car windshield frame and a rear side of a most rearward side window of the passenger car in a curve which slopes continuously downward to the belt line to form a fast back coupe passenger car shape.

36. A top according to claim 35, wherein the three roof sections are aligned in a surface-flush manner with respect to one another when said second roof section is in the closed top position.

37. A top according to claim 36, wherein the third roof section adjacent to the second roof section rests on a cross piece extending between the lateral roof frames for supporting a front of the third roof section.

38. A top according to claim 37, wherein the top with the three roof sections, the lateral guide rails and roof frames, the pillars, the cross piece, the supporting carrier and vehicle rear side windows together form a prefabricated module.

* * * * *